F. H. WEST.
Protractors.
No. 30,187.  Patented Sept. 25, 1860.
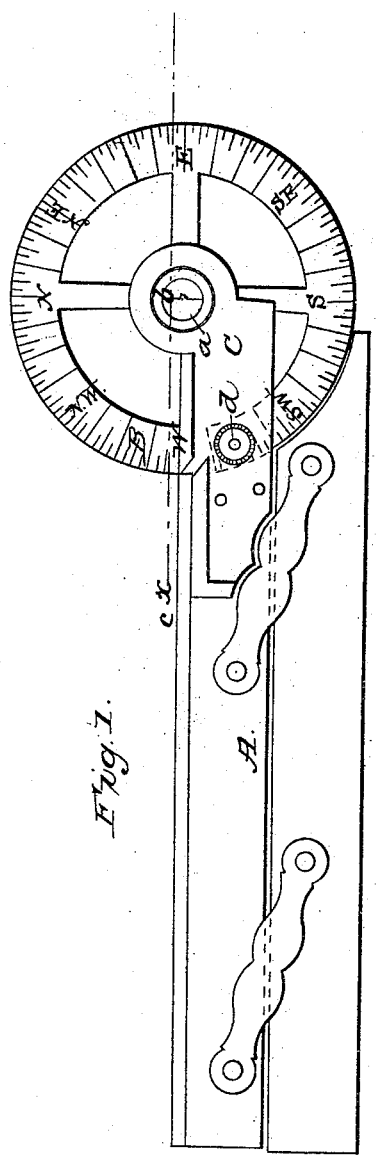
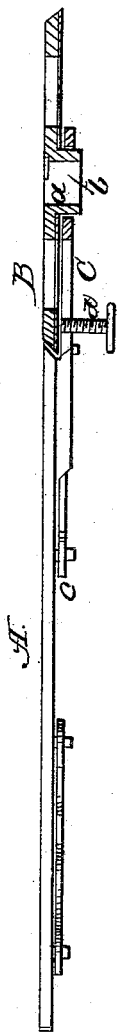

UNITED STATES PATENT OFFICE.

FRANK H. WEST, OF SAN FRANCISCO, CALIFORNIA, ASSIGNOR TO THOS. S. SEABURY, OF STONY BROOK, NEW YORK.

COMPASS-PROTRACTOR.

Specification of Letters Patent No. 30,187, dated September 25, 1860.

*To all whom it may concern:*

Be it known that I, FRANK H. WEST, of San Francisco, in the county of San Francisco and State of California, have invented a new and Improved Compass-Protractor; and I do hereby declare that the following is a full, clear, and exact description of the same, reference being had to the accompanying drawing, forming a part of this specification, in which—

Figure 1 represents a face-view of my invention. Fig. 2 is a longitudinal vertical section of the same, taken in the plane indicated by the line $x$, $x$, Fig. 1.

Similar letters of reference, in both views, indicate corresponding parts.

The instrument at present used for determining the ship's course from any position of the ship to a given point, or for the purpose of determining the bearings of surrounding objects, or for the purpose of determining the position of the ship from bearings, consists of ordinary parallel rulers. The use of these rulers requires a tedious operation, and furthermore the results obtained by the same are subjected to serious and embarrassing errors. In determining the ship's course from any position of the ship to a given point with said parallel rulers the operator is obliged to traverse the chart from the position of the ship to the compass of reference, which is laid out on the chart according to the true meridian, and then he has to calculate the magnetic course. In the meantime perhaps the table is uneven, or something has got under your chart, and during the operation the rulers may have slipped, and the result thus obtained will be altogether erroneous. And in order to determine the bearings of surrounding objects it is necessary to traverse the chart with the parallel rulers, once for every bearing to be found under all the circumstances above pointed out, and for each bearing a separate calculation has to be made, should magnetic bearings be required, all of which renders the operation tedious and liable to produce erroneous results. And in determining the position of the ship from bearings the same difficulties attend the operation so that the use of the parallel rulers can be intrusted only to a very experienced hand, and even then the result obtained is in most cases far from being perfectly correct.

To obviate these difficulties and to produce an instrument which enables even an inexperienced hand and also a person not acquainted with the manner of making a calculation, to take the necessary observations for the purpose of determining the ship's course to a given point, or the bearing of surrounding objects, or the position of the ship from bearings, is the object of my invention, which consists in the combination with ordinary parallel rulers of a movable circle, graduated as a compass and provided with a semi-circular opening with the exact center of the circle, marked therein in such a manner that by the combined operation of said circle, and the parallel rulers, all the operations for the purposes above stated can be made in a simple and easy manner, and without the necessity of any calculation.

To enable those skilled in the art to make and use my invention I will proceed to describe its construction and operation, with reference to the drawing.

A pair of orinary parallel rulers A, are connected to a circle B, by means of an arm C, which fits over the hub $a$, that is rigidly attached to the center of the circle B. The hub $a$, is perforated with a central half-circular opening $b$, in which the true center of the circle B, is marked, and the arm C, is secured to the rulers A, in such a manner that the edge $c$, of one of said rulers coincides exactly with the prolongation of one of the radii of the circle B. The upper edge of the arm C, forms a continuation of the edge $c$. The edge of the circle B, is beveled off at its under side and the end of the rulers which meets the circle is beveled off in the opposite direction so that the beveled edge of the circle B, after its hub $a$, has been entered into the arm C, is supported by the beveled end of the rulers without raising the upper surface of said circle above the upper surface of the rulers. A set-screw $d$, passing through the arm C, serves to arrest the circle in the desired position in relation to the rulers. The circle B, is marked on its face with a scale representing the points of the compass or it may be divided into the usual number of (300°) degrees, and the letters E, S, N, W, marked on the same, indicate the four cardinal points of the compass. The edge of one of the rulers A, may also be marked with a scale indicating the miles or any other known distance, in which case my instrument may be used with good advantage on land for surveying, or on sea for determining the distances.

The operation is as follows:—In determining the ship's course from any position of the ship to a given point, the center of the compass or circle B, is placed over the pencil on the chart, indicating the position of the ship, the circle is in the meridian that is it is placed in such a position that the north and south points are in a true meridian line, and if it is desired to get the magnetic course, the circle is turned either east or west according to the variation as marked on the chart, nearest to the position of the ship. The circle is now firmly pressed down and the rulers A, are turned until the radial edge $c$, passes through the point in question. The point marked by this edge on the compass gives the true magnetic course. In determining the bearings of surrounding objects from a given position of the ship, the center of the circle is placed over the point on the chart indicating the position of the ship. The rulers are now turned to the objects, the bearings of which are required and the bearing of each object is noted. In order to determine the position of the ship from bearings, the rulers are turned on the circle, until the edge, $c$, coincides with the first bearing noted, and they are clamped with the set-screw $d$. The circle is now placed on the magnetic meridian, and the instrument is moved up or down on the meridian until the edge $c$, of the rulers coincides with the object, the bearing of which has been taken, and a line is drawn. The rulers are now unclamped and turned until the edge $c$, coincides with the second bearing noted on the circle B, and they are again clamped by means of the set-screw, and the instrument is now moved on the line first drawn, always keeping it in meridian (which is easily done by keeping the points, which indicate the first bearing, on the circle B, always on the line first marked) until the edge $c$, of the rulers coincides with the object of your second bearing, and the center of the circle indicates the position of the ship.

With this instrument there is no liability of being in error from sliding the rulers over an uneven surface and the operator is not liable to apply the variation improperly, and any sailor, who can read a compass, can use it without the slightest difficulty.

Having thus fully described my invention, what I claim as new, and desire to secure by Letters Patent, is—

The combination with ordinary parallel rulers A, of a movable circle B, graduated as a compass, and provided with a semicircular central opening $b$, with the exact center of the circle marked therein, substantially in the manner and for the purposes herein set forth.

FRANK H. WEST.

Witnesses:
H. C. LOGAN,
WM. L. HIGGINS.